United States Patent [19]
Praglin et al.

[11] 3,895,661
[45] July 22, 1975

[54] CUVETTE APPARATUS FOR TESTING A NUMBER OF REACTANTS

[75] Inventors: Julius Praglin, East Lyme; James E. McKie, Jr., Ledyard; Alan C. Curtiss, Old Lyme; David K. Longhenry, East Lyme, all of Conn.

[73] Assignee: Pfizer Inc., New York, N.Y.

[22] Filed: July 12, 1973

[21] Appl. No.: 378,594

Related U.S. Application Data

[62] Division of Ser. No. 281,946, Aug. 18, 1972, Pat. No. 3,832,532.

[52] U.S. Cl. .................. 141/241; 23/259; 141/325; 195/127
[51] Int. Cl. .............................................. B65b 3/06
[58] Field of Search ............ 23/259; 141/1, 83, 241, 141/273, 274, 319–322, 325, 326, 363–366, 237, 238; 195/103.5, 120, 127; 137/265; 222/426

[56] References Cited
UNITED STATES PATENTS
3,304,965    2/1967    Tate................................... 141/325

*Primary Examiner*—Richard E. Aegerter
*Assistant Examiner*—Frederick R. Schmidt
*Attorney, Agent, or Firm*—Connolly and Hutz

[57] ABSTRACT

The light scattering of a number of aliquots of a given bacterial/broth suspension, each containing a different antibiotic are rapidly measured and compared with the forward light scattering of a control suspension of the bacteria in the absence of antibiotic. The inhibitory effectiveness of each antibiotic on the growth of the bacteria is then computed from the substantially simultaneous readings and printed out. The bacterial/broth suspension samples are conveniently deposited in a disposable, plastic, transparent, compartmented container or cuvette into which antibiotic discs are introduced into all but one compartment (chamber) from a ganged disc dispenser. The partitioned cuvette includes a filling reservoir from which the inoculated broth is introduced as equal volume aliquots into the interconnected lobes of a row of double lobed chambers. Rotation of the partitioned cuvette transfers the equal volumes of broth inoculum from the interconnected lobes to the transparent and separated lobes of the chambers.

19 Claims, 28 Drawing Figures

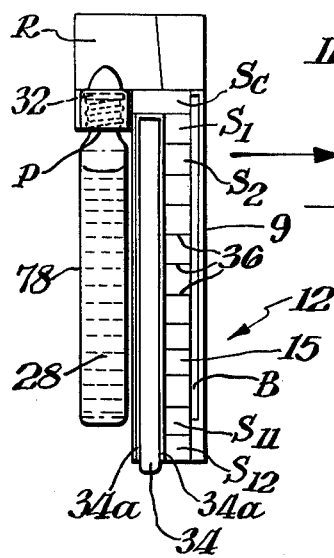
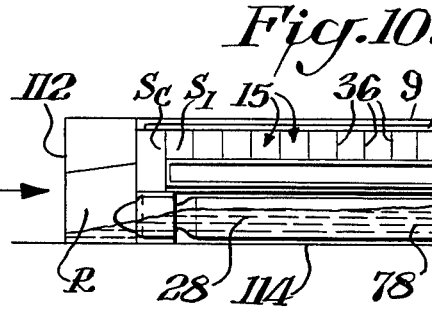
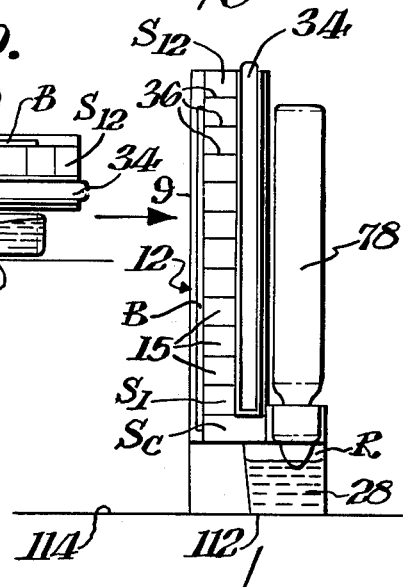
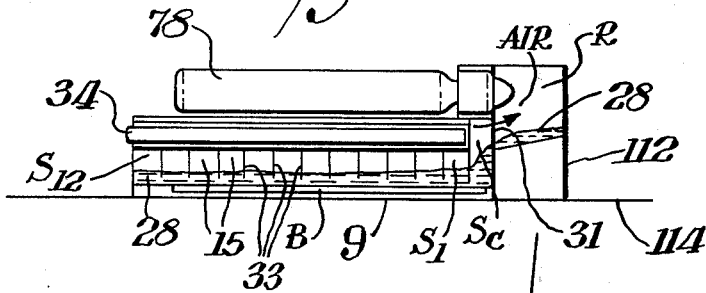
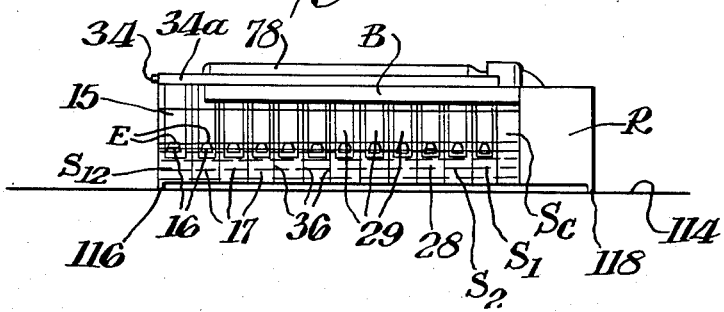

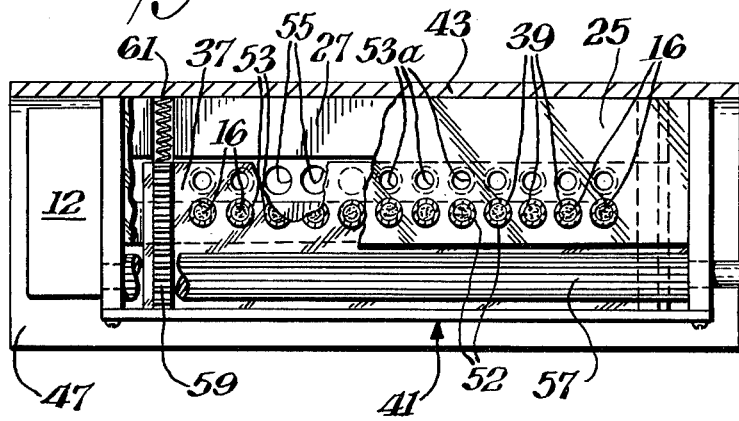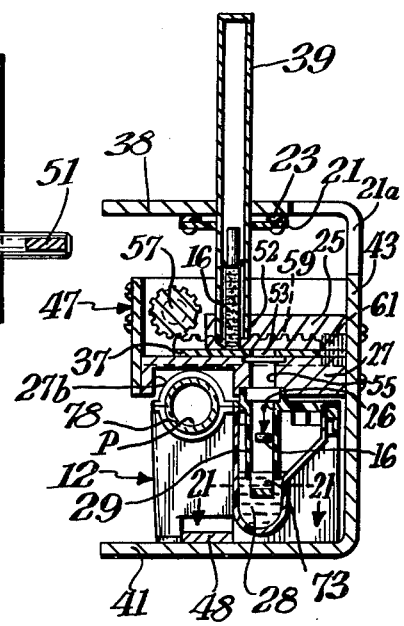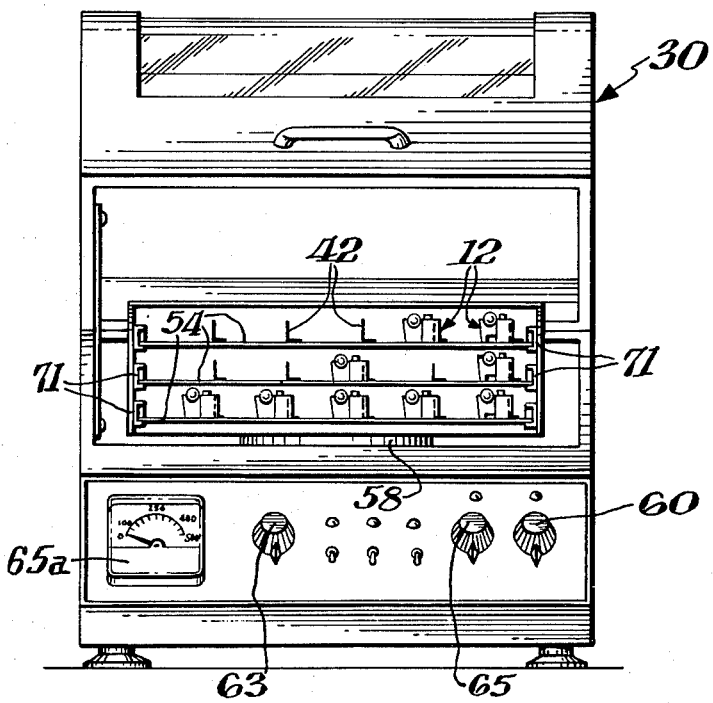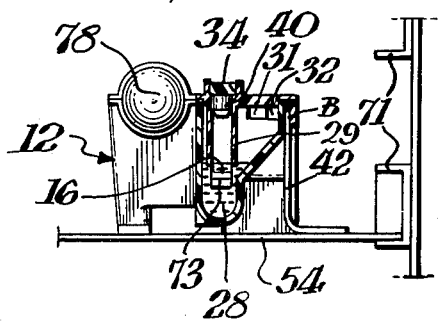

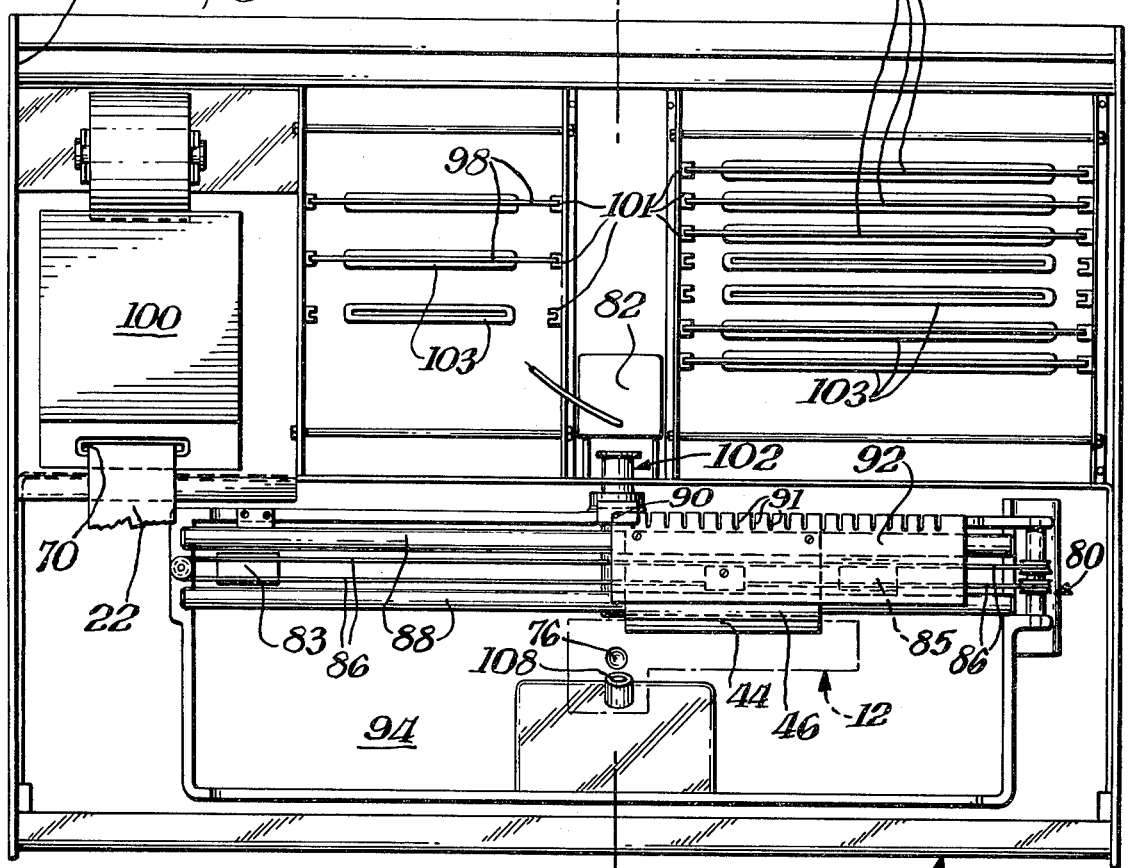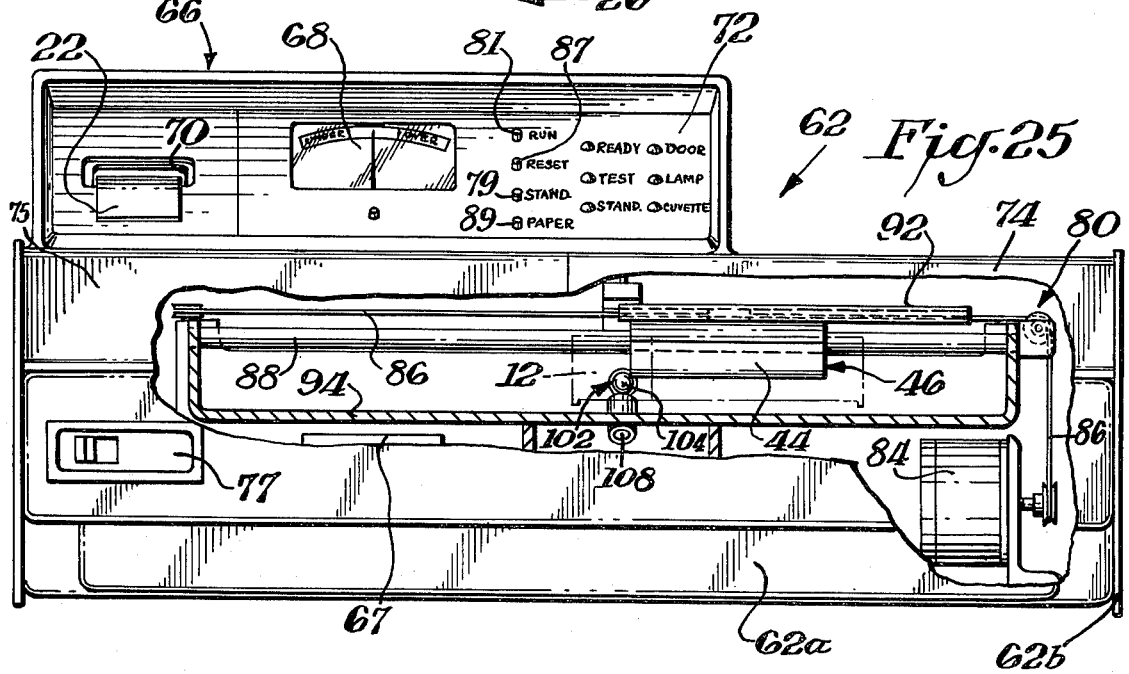

CUVETTE APPARATUS FOR TESTING A NUMBER OF REACTANTS

CROSS-REFERENCE TO RELATED APPLICATION

This application is a division of application Ser. No. 281,946, filed Aug. 18, 1972, now U.S. Pat. No. 3,832,532 by these same inventors.

BACKGROUND OF THE INVENTION

Hospital clinical laboratories have the problem of determining the antibiotic to which pathogenic bacteria isolated from a particular patient is most susceptible. The Kirby-Bauer procedure described in an article entitled "Disc Susceptibility Testing" printed in "Hospital Practice" February 1970, Vol. 5, No. 2, pages 91–100, measures a zone of inhibition about an antibiotic disc in a gel containing the bacteria. It requires about one day to complete and involves considerable handling, labor time and exposure to the pathogenic bacteria. A highly automated particle-counting system is described in Applied Microbiology, December 1971, pages 980–986. It provides results in a few hours but is extremely complicated and expensive and kills the bacteria, thus precluding repetition. Light scattering photometers with laser beams have also been used to study changes in a scattering curve obtained by a rotating detector to determine susceptibility of bacteria to different antibiotics. Such systems and devices are based upon cell size/shape changes and not inhibition of growth (upon which valid conclusions can be drawn regarding bacterial susceptibility), require highly skilled analysis and are relatively expensive. An object of this invention is to provide a relatively simple and economical method and apparatus for antibiotic susceptibility testing which is not only based upon accepted and verified principles of antibiotic susceptibility testing but is also rapid, efficient, economical in time and equipment, direct reading, simple to operate by ordinary laboratory technicians and which permits rerunning for verification.

SUMMARY

In accordance with this invention the effectiveness of a number of different reactants, such as antibiotics, is determined by simultaneously adding the antibiotics to a number of identical samples of a given bacterial suspension. Preparation, antibiotic addition and photometric analysis of the samples is remarkably facilitated by depositing them in a transparent compartmented container or cuvette in which antibiotic discs are simultaneously introduced from a ganged disc dispenser. The cuvette may advantageously include a filling reservoir at one end of a row of double lobed chambers — each lobe of which is connected with each other by interdisposed vents and connecting ports. The interconnected lobes are rotated down on their sides to equally fill them with the bacteria suspension transferred from the reservoir to the lobes through the lower connecting ports of the lobes in conjunction with the upper vents of the lobes. When the cuvette is then rotated to position the interconnected lobes in an upright position, the sample solution flows from the interconnected distribution lobes into the disconnected testing lobes. The antibiotic discs are conveniently dropped into each of the testing lobes within apertured tubes extending through the top walls and such discs are thereby held immersed a short distance into the bacterial suspension trapped within the testing lobe of each chamber. The antibiotic discs may be added before or after the inoculum as practical considerations dictate. The testing lobes are optically transparent and shaped to facilitate rapid photometric analysis, such as by rapidly indexing them past a light source and photometric detector — advantageously of the light scatter detecting type. If the determined growth index ratio is too low, the cuvette may be reincubated and reread before disposal.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIGS. 9–13 are partially schematic views of successive steps in filling the cuvette shown in FIGS. 2–8 from a supply tube;

FIG. 18 is a cross-sectional view taken through FIG. 15 along the line 18—18;

FIG. 20 is a cross-sectional view similar to FIG. 19, but in the dispensing position;

FIG. 21 is a cross-sectional view taken through FIG. 20 along the line 21-21;

FIG. 22 is a front view in elevation of the incubator-shaker apparatus used in conjunction with the cuvette of this invention with its door open;

FIG. 23 is an enlarged end view of a cuvette inserted and mounted within the incubator-shaker shown in FIG. 22;

FIG. 24 is a top plan view of an analyzer with cover removed which is used in conjunction with the cuvette of this invention;

FIG. 25 is a front elevational view of the analyzer shown in FIG. 24 partially broken away to show the inserted cuvette and carriage for indexing it within the analyzer;

DESCRIPTION OF THE PREFERRED EMBODIMENT

Figure 1:
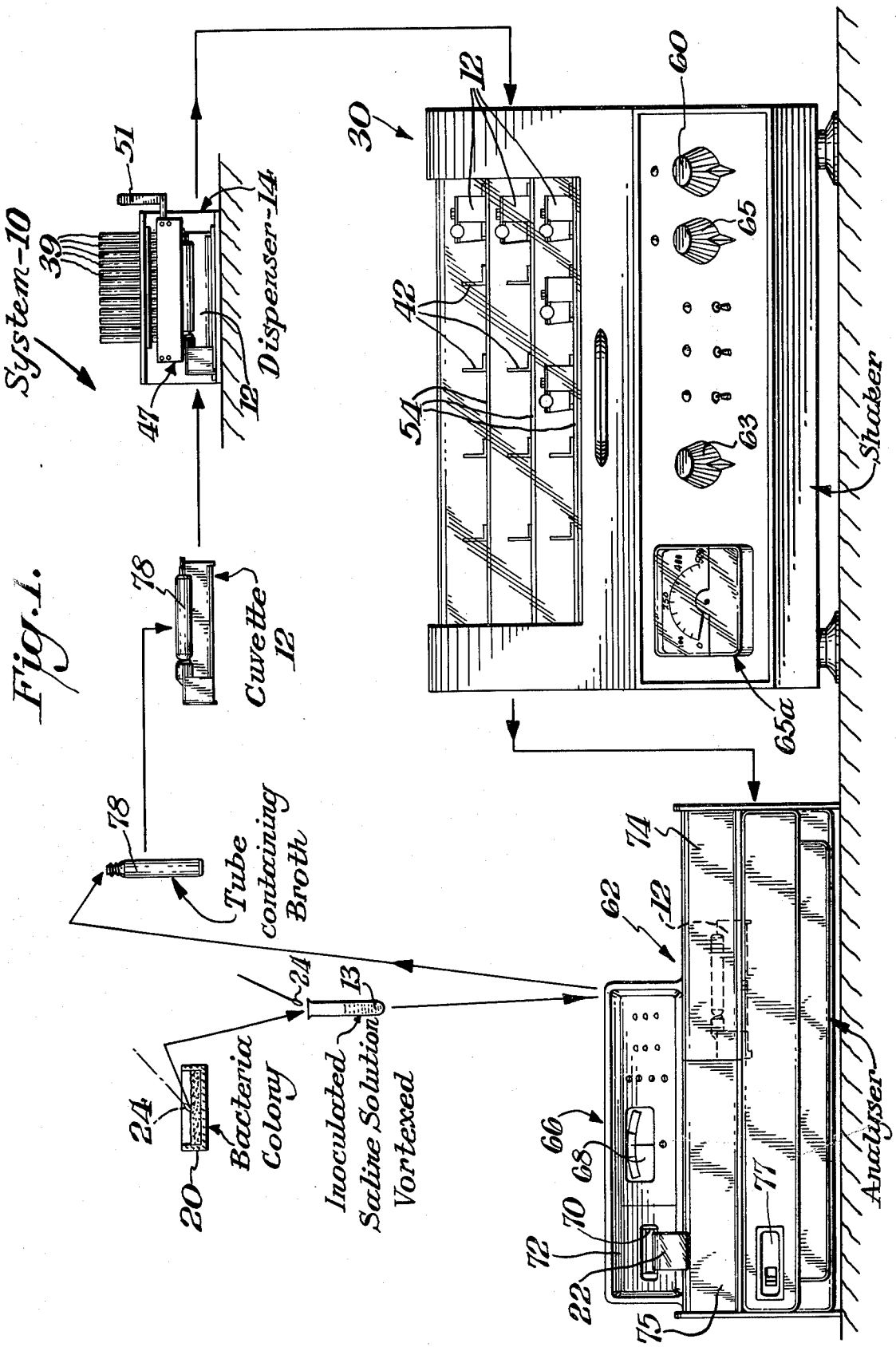
FIG. 1 is a partially schematic diagram of apparatus associated to test antibiotic susceptibility including the cuvette of this invention.
Figure 2:
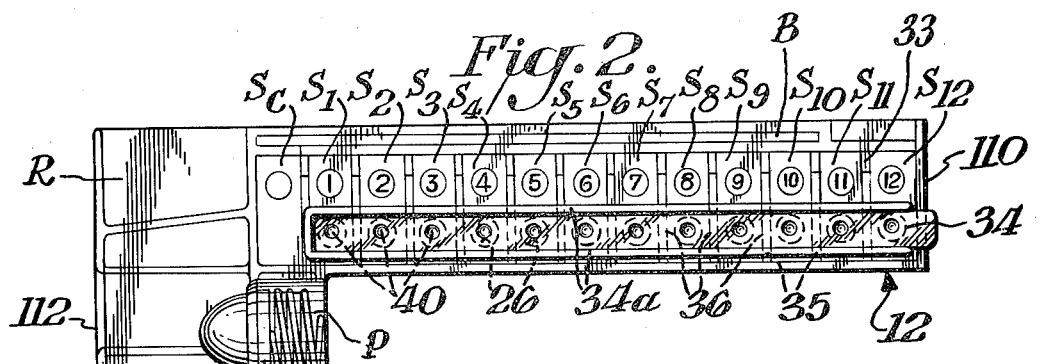
FIG. 2 is a top plan view of the cuvette portion of the apparatus shown in FIG. 1 which is an embodiment of this invention.
Figure 3:
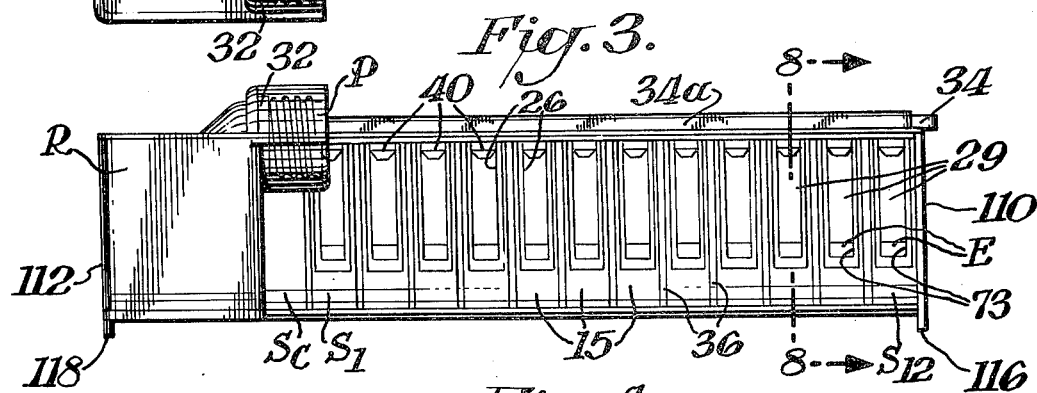
FIG. 3 is a front view in elevation of the cuvette shown in FIG. 2.
Figure 4:
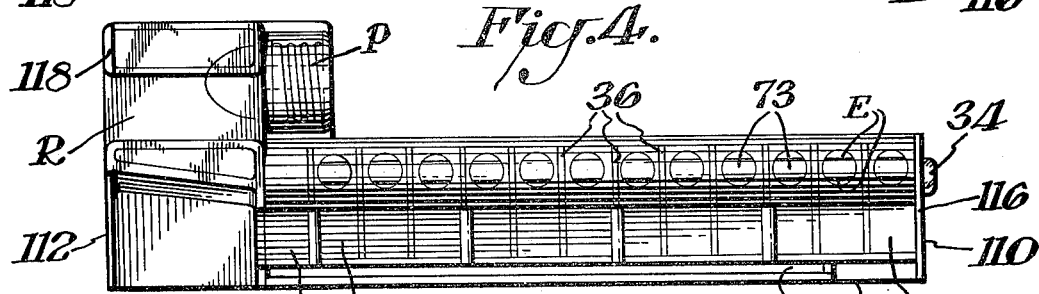
FIG. 4 is a bottom plan view of the cuvette shown in FIGS. 2 and 3.
Figure 5:
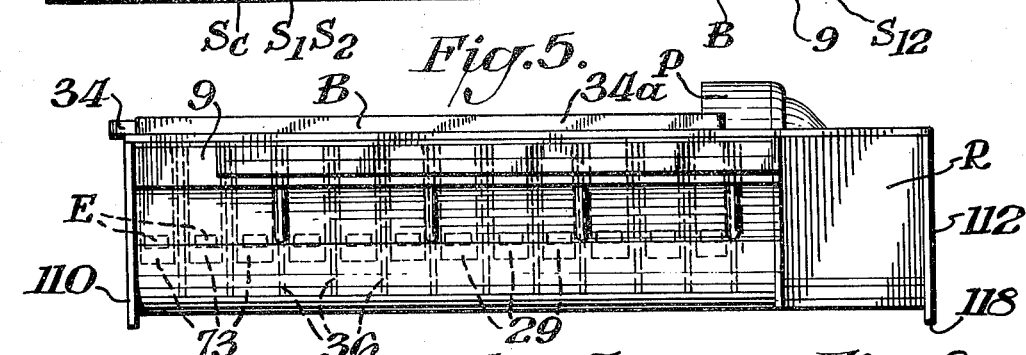
FIG. 5 is a rear view in elevation of the cuvette shown in FIGS. 3 and 4.

As shown in FIG. 1, system 10 for determining the relative effectiveness of a number of different reactants, such as antibiotics (twelve for example) to inhibit the growth of bacteria includes: a disposable plastic cuvette 12 in which the susceptibility tests are performed, a disc dispenser 14 for inserting discs 16 into cuvette 12, an incubator-shaker 30 for incubating and agitating the cuvettes and an automatic light-scattering photometer analyzer 62 for evaluating bacterial growth and printing the results on a preprinted form or tape 22 as later described in detail.

Prior to the test procedure described herein in detail, a clinical isolate is obtained, transferred to a Petri dish 20 and incubated overnight. Several colonies of similar morphology are then picked from the plate by the bacteriologist using loop 24 and suspended via vortexing in saline solution in tube 13. By use of the photometer instrument's standardizing mode, the suspension in tube is made up to a standard bacterial concentration which is checked in analyzer 62 by insertion in port 64 in cover 74 and read on meter 68. Two ml. of the above suspension is added to 18 ml. of eugonic broth in a screw top test tube 78. Test tube 78 screws on to plastic cuvette 12, and a simple manipulation transfers the test tube contents evenly to thirteen cuvette test compartments $S_c$ and $S_{1-12}$. Elution discs 16 are now added through ports 26, uncovered by removal of closure 34, by disc dispenser 14 and are held suspended in the growth medium 28 in twelve disconnected lobes 17 of chambers $S_{1-12}$ by plastic tubular fingers 29 in the cuvette top. The thirteenth chamber $S_c$ is the control. Cuvette 12 is now incubated for three hours in an incubator-shaker 30 designed to hold up to thirty cuvettes. At the end of three hours, a cuvette 12 is inserted in analyzer instrument 62, and the growth in each chamber $S_c$ and $S_{1-12}$ is evaluated. By comparison to the control chamber $S_c$, the relative inhibitory effect of each antibiotic in $S_{1-12}$ is calculated and printed as later described in detail.

The eugonic broth has the following composition in grams per liter and a pH of 7.0.

| Constituent | Content |
| --- | --- |
| Peptone "C" | 15.0 |
| Peptone "S" | 5.0 |
| Dextrose | 5.5 |
| Sodium Chloride | 4.0 |
| Sodium Sulfite | 0.2 |
| l-Cystine | 0.7 |

Details of the four components of system 10 are as follows:

A. Cuvette 12

The measurement of the effect of antimicrobial agents on the growth of microorganism in broth requires a chamber (cell) to contain the inoculated broth. The detection of growth in broth by forward light scattering requires such a chamber to be both optically transparent to the irradiating light used and geometrically consistent with the light scattering photometer. Convenient and rapid examination of the effect of many antimicrobial agents on the growth of a given microorganism is accomplished by a linear array of such optical chambers as a single unit. Cuvette 12 also permits the convenient introduction of an equal volume of broth inoculum into each chamber S. Cuvette 12 also has the capability of conveniently accepting an antimicrobial impregnated paper disc into all test chambers and is not capable of accepting such an antimicrobial disc in its single control chamber. Furthermore, cuvette 12 is water-tight, optically polished, optically reproducible, inexpensive, relatively small, stackable, and may be disposable.

Cuvette 12 is shown in FIGS. 2–8. It is composed of optically clear and inert plastic, such as polystyrene, and is produced by the injection molding process in two sections using optically polished steel molds. After injection molding, the two sections are sealed together by either solvent or ultrasonic energy to produce the cuvette. Ultrasonic sealing is preferable because it avoids marring of the optical surface by excess solvent. Cuvette 12 is a linear array of one control chamber, $S_c$, and twelve antimicrobial test chambers, $S_{1-12}$. The only other material besides polystyrene used in the illustrated cuvette 12 is a flexible polymer, such as Krayton. Krayton is the trademark for a styrene-butadiene polymer made and sold by The Shell Chemical Co. Krayton gasket 32 and a closure 34 are inserted into cuvette 12 prior to final packaging.

Cuvette 12 includes six parts:

1. Inoculum Tube Port (P) (FIGS. 2–7)

A threaded orifice which accepts an 18-415 threaded tube 78, containing inoculated broth. A Krayton gasket 32, positioned at the base of the port provides a water-tight seal between the cuvette and inoculum tube.

2. Reservoir (R) (FIGS. 2–7)

It accepts the broth inoculum from the inoculum tube by manually rotating the cuvette.

3. Interconnected Distributing Lobes 15

A row of lobes 15 extends the entire length of the long axis of the cuvette (excluding the reservoir). They are connected to the reservoir by a major distribution port 31, and accept broth inoculum from the reservoir by manually rotating the cuvette to lower them and cause equal amounts of solution to fill them through distributing ports 33 assisted by return flow of air through vents 35. The area of ports 33 increases away from reservoir R.

Figures 6, 7, 8:
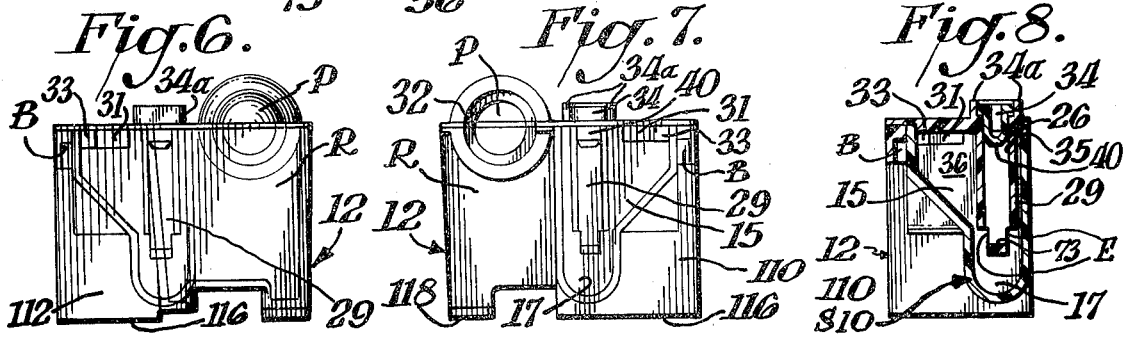
FIG. 6 is a left end view of the cuvette shown in FIGS. 2 and 3.
FIG. 7 is a right end in elevation of the cuvette shown in FIGS. 2 and 3.
FIG. 8 is a cross-sectional view taken through FIG. 3 taken along the line 8-8.
Figure 14:
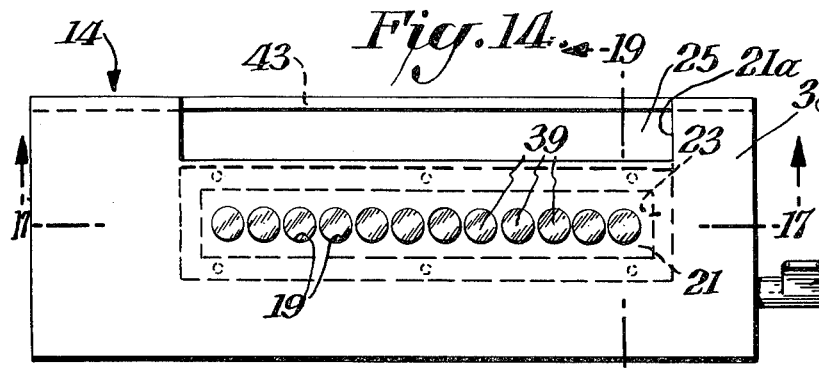
FIG. 14 is a top plan view of a ganged disc dispenser for use in conjunction with the cuvette of this invention.
Figure 15:
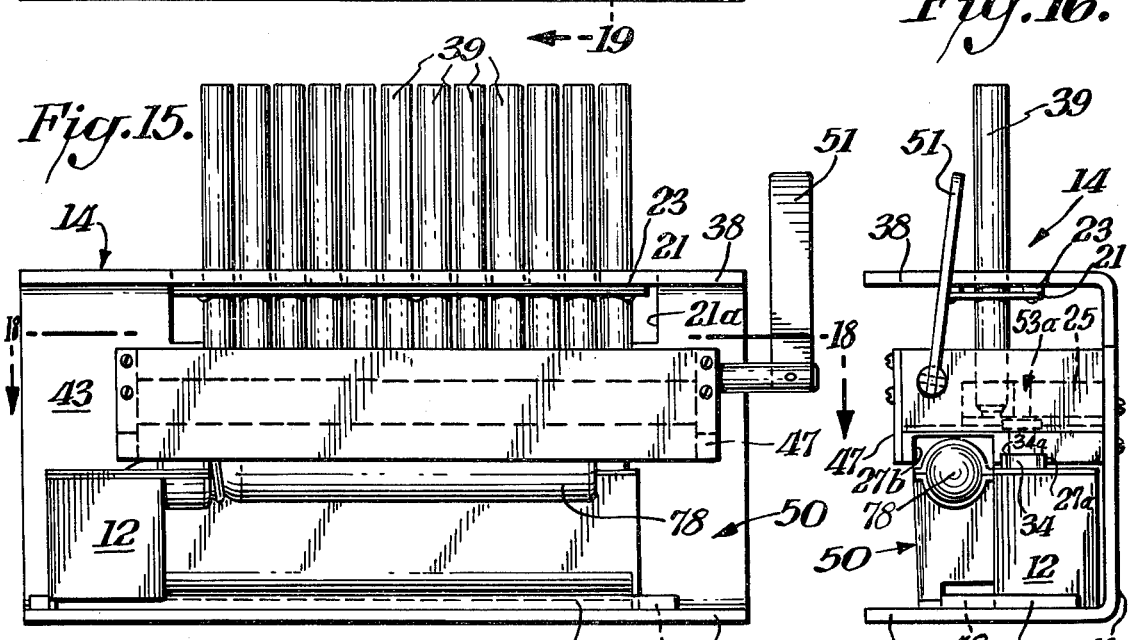
FIG. 15 is a front view in elevation of the dispenser shown in FIG. 14.
Figure 16:
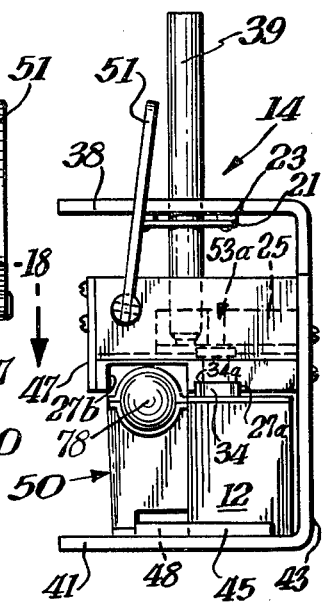
FIG. 16 is a right end view of the dispenser shown in FIG. 15.
Figure 17:
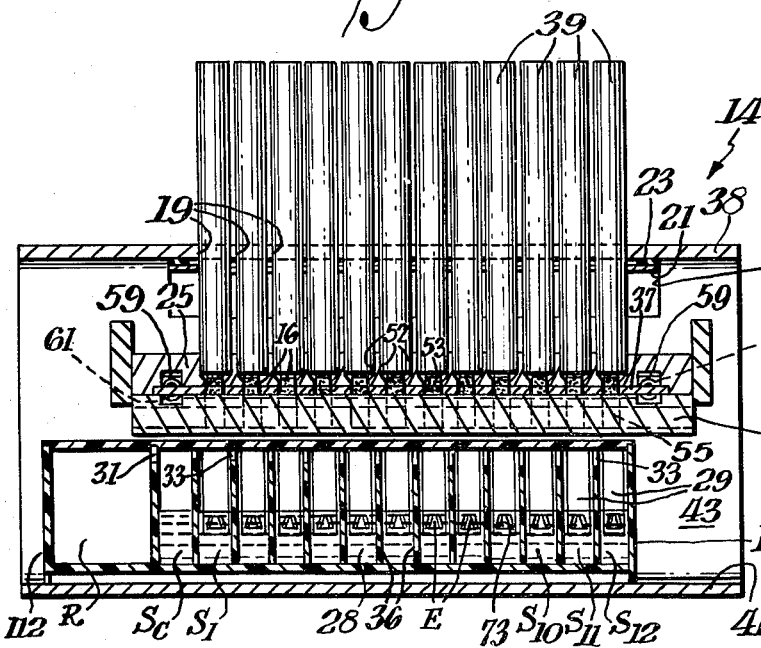
FIG. 17 is a cross-sectional view taken through FIG. 14 along the line 17—17.
Figure 19:
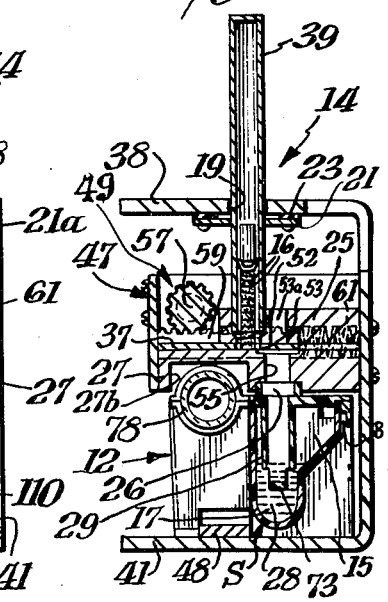
FIG. 19 is a cross-sectional view taken through FIG. 14 along the line 19—19 with the dispenser in the ready position.

4. Light Scattering Lobes 17 (FIGS. 7 and 8)

Thirteen disconnected light scattering lobes 17 of chambers $S_c$, $(S_1, S_2 \ldots S_{12})$ accept an equal volume of broth inoculum from interconnected distributing lobes 15 by manually rotating the cuvette 90° about its long axis to lower them. Once filled with broth inoculum the thirteen chambers S are isolated from each other by the partitioning walls 36. Distributing ports 33 and air distribution vents 35, located at the top of each partition 36 and well above the broth level are the only interconnections between the chambers. These vents are necessary for proper fluid distribution into lowered distributing lobes 15 as described above.

5. Tubular Antimicrobial Disc Holders (29) (FIGS. 7, 8 and 21)

Twelve apertured tubular fingers 29 extend down into the twelve test scattering chambers ($S_1, S_2 \ldots S_{12}$). Each hollow finger, known as a disc holder, accepts an antimicrobial paper disc 16 (6.5 mm diameter) via twelve disc ports 26 on the top surface of cuvette 12. The disc drops into the disc holder 29 and comes to rest on the floor 73 of this holder. Two elution ports, E, in the walls of the disc holder adjacent to the disc permit elution of antimicrobial agent into the surrounding broth innoculum of the scattering chamber. A strip 34 of Krayton with twelve nipples 40 (called the closure inserts) into the disc ports 26 to provide a watertight seal for each disc holder. Strip 34 is received between parallel rails 34a straddling ports 26 on the upper surface of cuvette 12.

6. Bracket B (FIGS. 2 and 4–8)

An L-shaped bracket B located on the back of cuvette 12 and extending the length of the cuvette long axis enables the attachment of the cuvette to holding brackets 42 in the incubator-shaker 30 and to the holding bracket 44 of the photometer carriage 46. Cuvette bracket B thereby enables correct positioning of the cuvette during both the incubation-agitation period and the photometric scanning period.

B. Disc Dispenser

Disc dispenser 14 shown in FIGS. 14–20 conveniently and rapidly introduces a single antimicrobial impregnated paper disc 16 into each of the twelve (or less if desired) disc holders 29 with the entire panel of discs added simultaneously by a simple manual manipulation. The upper plate section 38 of the free-standing dispenser 14 accepts a maximum of twelve cartridges 39 containing antimicrobial discs 16. Glass cartridges 39 are identical to those currently being used for Kirby-Bauer discs. The lower plate section 41 of dispenser 14 contains a track guide 48 which accepts a cuvette 12 in upright position. Upper plate 38 and lower plate 41 are joined on a channel form by rear vertical wall 43. Cuvette 12 is inserted on track 48 into cavity 50 until stop 45 is reached. The top of cuvette 12 is guided by insertion of the parallel rails 34a in slot 27a in the bottom of plate 27 later described. Another slot 27b is provided in the bottom of plate 27 for passage of inoculum tube 78. The middle section 47 of the dispenser 14 has mechanism 49 somewhat similar to that shown in U.S. Pat. Nos. 3,031,819, 3,036,703 and 3,115,992, which upon actuation of a lever 51, slides a single disc 16 out of each cartridge 39 and drops the disc 16 into the tubular disc holder 29 of the cuvette. In this manner, twelve discs can be simultaneously added to a cuvette.

Cartridge tubes 39 are inserted through holes 19 in upper plate 38 and adjacent support plate 21 and spacer plate 23. Midsection 47 includes spaced horizontal guide plates 25 and 27 between which slide plate 37 reciprocates. Upper plate 25 includes counterbored holes 52 which receive the bottom ends of cartridge 39. Slide plate 37 includes holes 53 which receive discs 16 from tubes 39 and drop them through holes 55 in plate 27 into ports 26 in cuvette 12. Viewing slot 21a allows user to monitor operation and to easily clear jamming through holes 53a in plate 25 caused by any malfunction, such as of a disc 16 in a hole 55 in plate 27. Plate 37 is reciprocated by lever 51 through splined shaft 57.

Racks 59 energizing splined shaft 57 are connected to the ends of slide plate 37 to move it back and forth by lever 51. Compression springs 61 react between vertical wall 43 and the rear edge of slide plate 37 to return it to the receiving position.

Although the disc method of dispensing antibiotics to the broth inoculum is advantageous because of convenience, other methods of antibiotic introduction such as lyophilized powder addition or solution addition are possible.

C. Inucbator-Shaker 30 (FIGS. 22 and 23)

The effect of an antimicrobial agent on a broth inoculum is normally measured in an in vitro system incubated at 35°–37°C. During such an incubation, mild agitation: (1) insures rapid elution of antimicrobial agent from the paper disc (i.e., in less than ten minutes most antibiotics elute 100 percent of their nominal value); (2) enables new organisms formed in the growth process to be suspended in the broth rather than appearing as growth on the walls or at the meniscus where they are unavailable for proper light scattering detection; and (3) avoids the formation of bubbles which occur on the chamber walls when certain organisms multiply. The dual requirements of incubation and agitation are, therefore, satisfied most uniquely by combination incubator-shaker 30 and the cuvette 12 design.

The incubator-shaker, shown in FIGS. 22 and 23, is a modified form of that described in U.S. Pat. Nos. 3,002,895 and 3,430,926. It accepts up to thirty cuvettes in three interchangeable racks 54. Each rack 54 has ten brackets 42 for holding cuvettes via the cuvette bracket B. The three racks 54 are securely locked into position in channel brackets 71 on a platform 58 which rotates at a predetermined frequency and amplitude. A 220 rpm circular rotation of ¾ inch diameter amplitude has been determined to be the best agitation conditions enabling good antimicrobial disc elution and organism suspension while at the same time preventing chamber to chamber cross contamination of broth inoculum via the upper ports and air vents in the cuvette. The rotational agitation of the cuvettes takes place in a chamber maintained at 36°± 0.5°C. by an on-off temperature controller. A safety thermostat 60 is incorporated into the incubator to provide a back-up temperature control system in the event of failure of the main thermostat. Although the present incubator-shaker 30 has the capability of variable rotational frequency through speed control knob 63 and variable temperature through temperature control knob 65, in the preferred form of the device, knobs 60, 63 and 65 and meter 65a may be removed and operation may be performed at the preferred rotational rate of 220 RPM and temperature of 36° ± 0.5°C.

D. Photometer Analyzer 62

1. Function

Photometer analyzer 62 has four principal functions: (1) inoculum standardization to provide the means for determining when the microbial concentration of the starting saline stock inoculum is within relatively narrow and well defined limits (e.g., 1 to 3 × $10^7$ cells/milliliter); (2) to provide the means for determining the level of growth in all scattering chambers of the incubated cuvette; and (3) to calculate and print out for each scattering chamber containing an antimicrobial, a reading which is readily interpretable in terms of the susceptibility or resistance of the microorganism to the antimicrobial agent.

2. Exterior

Figure 26:
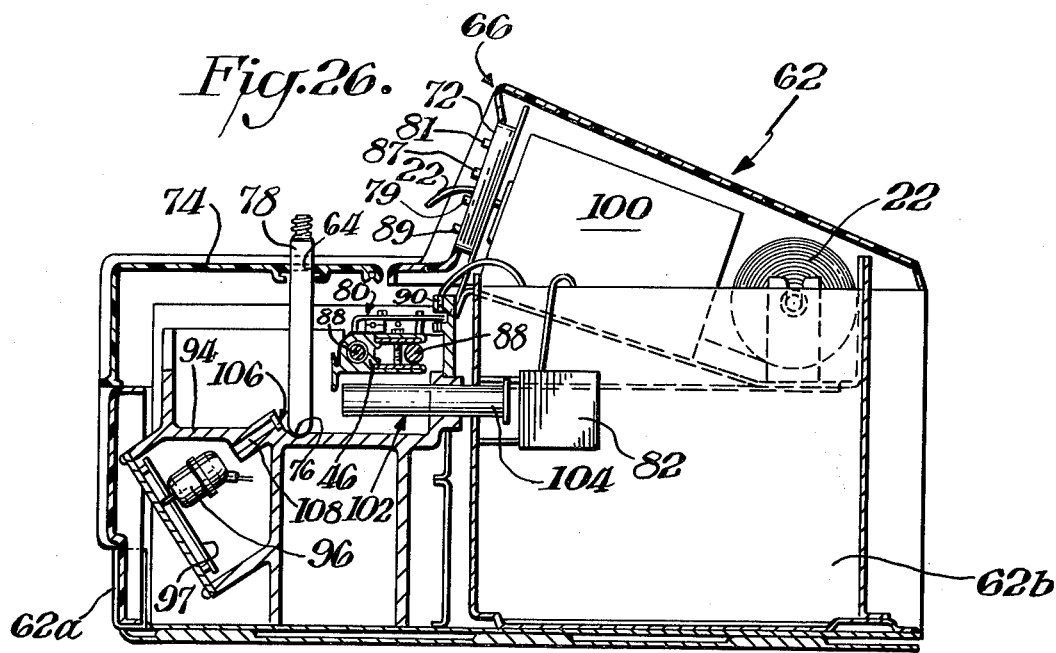
FIG. 26 is a cross-sectional side elevational view taken through FIG. 24 along the line 26—26 showing a supply tube inserted for preliminary minimum bacteria colony content test.

FIG. 25 shows a front view of the instrument 62 with doors 74 and 75 closed. The control panel 66 with the inoculum meter 68 and printer slot 70 is contained in instrument housing 72. The doors 74 and 75 give access to cuvette carriage chamber 46 as shown in FIG. 26. Port 64 in the right door 74 is provided for inserting inoculum tube 78 with its lower end resting within indentation 76 in casting 94. Normally only the right door 74 is opened. The left door 75 is provided for maintenance purposes. On the left side below the door 75 is the instrument power switch 77. Instrument cover 66 and instrument front 62a are fabricated from 5/32 inch ABS plastic while the doors 74, 75 and front panel 72 and frame 62b are steel or aluminum.

3. Interior

Figure 27:
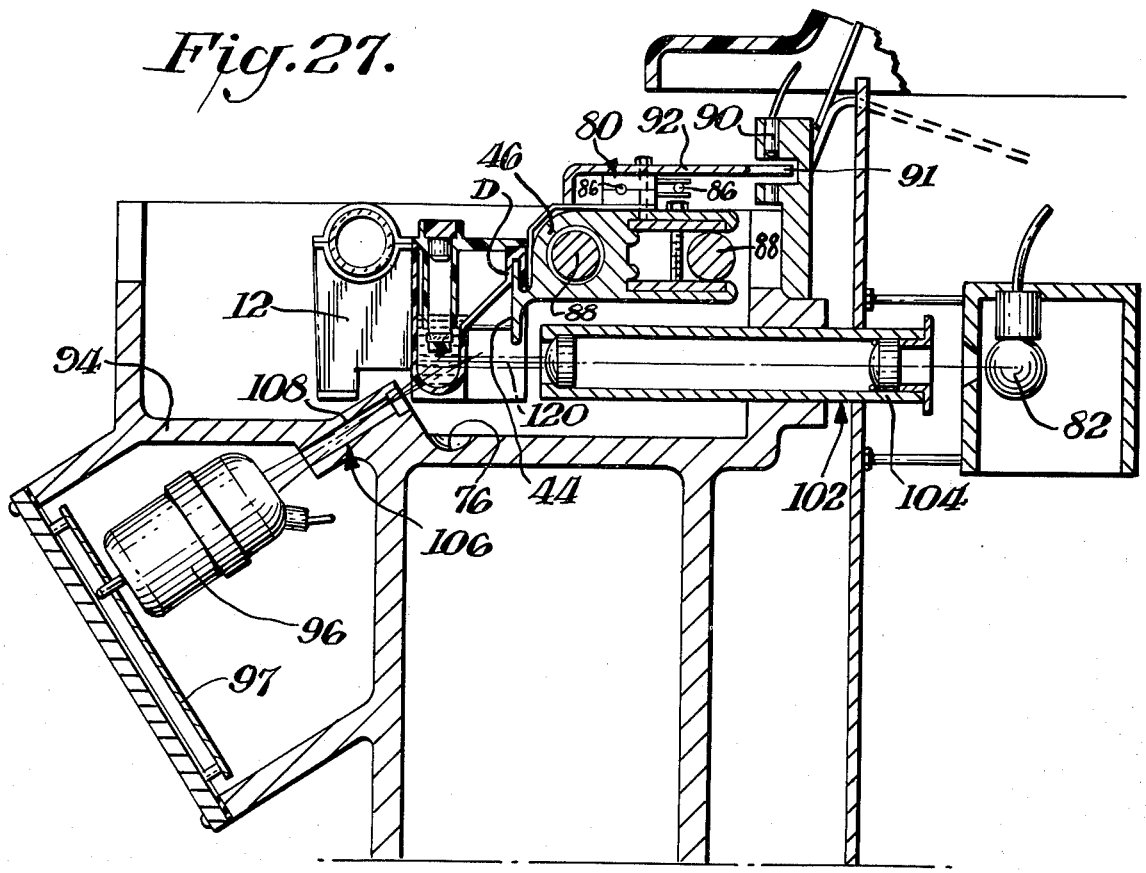
FIG. 27 is a cross-sectional side elevational view similar to FIG. 26 showing the cuvette being scanned.

Refer to FIGS. 24–25 and 27 showing instrument 62 with cuvette 12 in place. Cuvette drive mechanism 80 traverses cuvette 12 from right to left past photometer light source 82 and the optical system 102. This mechanism employs a motor 84 linked via a cable 86 to carriage 46 sliding on parallel bars 88. Limit switches 83 and 85 actuate forward or reversing movement of motor 84. An optical sensor 90 on the instrument senses the cuvette position by reading index slots 91 in a slide 92 mounted on carriage 46 (FIG. 24).

FIG. 25 shows instrument 62 from the front with covers broken away. Transformer 67 is on the lower left and drive motor 84 is on the right. In the center is the main casting 94 which holds the drive mechanism 80. The photometer transducer 96 is in its base.

Figure 28:
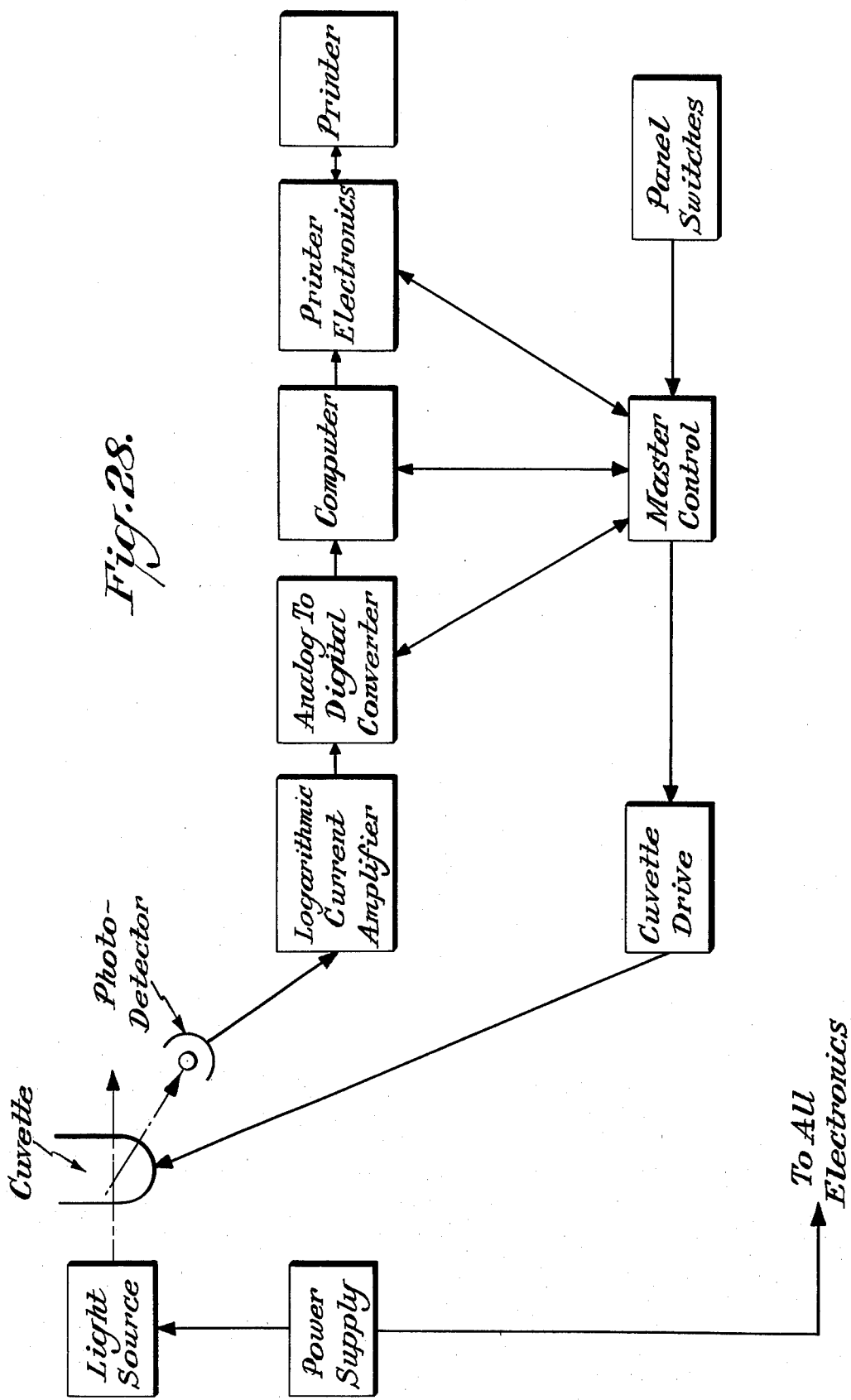
FIG. 28 is a block diagram of the electronic system.

FIG. 24 shows printed circuit cards 98 and 99 occupying the rear of instrument 62. To the left of cards 98 is printer 100. In the center is the light source 82 and optical system 102. Optical system 102 employs a Quartz Halogen lamp 82 and a simple two lens condensing system 104. Receiver 106 uses a collimator tube 108 placed at a 35° angle as shown in FIG. 27. A photometer transducer 96 includes a photo cell circuit of any functional type as shown diagrammatically in FIG. 28 and physically in FIG. 27. FIG. 28 shows photo transducer or photo cell 96 connected to logarithmic preamplifier 97.

Printed circuit cards 98 comprise the control and regulator electronic section of this device. Printed circuit cards 99 comprise the calculating and computing section of this device. Cards 98 and 99 are inserted in channel supports 101 and are connected by standard cables (not shown) and plugs 103.

E. Electronics

FIG. 28 is a block diagram of the electronic system. The essential components are the following:

1. Power Supply

The power supply furnishes the voltages necessary to operate the electronics and to energize the optical system light source. The regulation is such that the system is not affected by line voltage variations from 95 to 140 volts. The system can also operate on the 230V 50 cycle power line common in foreign countries.

2. Photo-Detector and Logarithmic Amplifier

These components detect the light scattered by the bacterial suspension. The analog output of the logarithmic amplifier equals the logarithm of the photodetector current in microamperes. The circuit is exceptionally stable and requires no adjustment over the life of the instrument.

3. Analog to Digital Converter

The light scatter signals from the analog amplifier are converted to a binary digital number by the Analog to Digital (A/D) converter. The converter employs a dual slope integration technique for A/D conversion. This technique insures high noise immunity and excellent stability.

4. Computer Unit

The digital form of the light scatter signal is now sent to the computer unit. The result is converted from a binary to a decimal number.

5. Printer Electronics

The result is then transmitted to the Printer Electronics which causes the computation to be printed out.

6. Cuvette Drive Electronics

This circuitry controls the stepper motor 84 which moves the cuvette carrier mechanism 46. Commands from the master control unit can start, stop or brake the motor 84.

7. Master Control Unit

On command from the operator through the switches on the front panel 72 the Master Control does the following:

Run command: The master control determines if the cuvette 12 is in place and the door 74 is shut. Then, if the Run button 81 is pressed, the unit synchronizes the advance of the cuvette with the A/D converter and the printer. After the last cuvette compartment is read, the master control returns the cuvette to the home position and feeds the printed tape 22 through the paper slot 70.

Standardize: If the standardize button 79 is pushed, a test tube 13 may be inserted into the port 64 in the right door 74 and the inoculum standardized. Pushing any other button returns the instrument to the ready state.

Reset: Pressing this button 87 aborts the test and returns the cuvette 12 to the home position.

Paper: Pressing the button 89 controls the feeding of paper 22 from the printer 100.

OPERATION

A. Preparation of the Standard Inoculum

The standard inoculum is a suspension of a pure bacteria in 0.90 gm% sodium chloride which is between the limits of 1 to $3 \times 10^7$ viable cells per milliliter. This standard saline stock inoculum in an optically acceptable (i.e., clean, scratch-free) $16 \times 125$ mm round-bottom flint glass tube will give a 35° angle scattering signal of $-\log S$ between 2.2 ($1 \times 10^7$ cells per mil.) and 1.9 ($3 \times 10^7$ cells/ml when placed in the photometer). The photometer standardization meter 68 has a central region (occupying 40 percent of the total meter range) stating "correct inoculum range." Its two boundaries correspond to the two acceptable scattering limits. The left region of the meter (occupying 30 percent of the total meter range) states "under" and/or "add more organisms," while the right region (occupying the remaining 30 percent of the total meter range) states "over" and/or "dilute with saline."

The standard inoculum is prepared by transferring a colony or colonies of a given bacteria from a 16–24 hour agar plate into a $16 \times 125$ mm. standard saline inoculum tube 13 containing 6.0 ml. of 0.45 micron membrane filtered, sterile, 0.90 gm % saline. A microbiological loop 24 is used for this purpose and the usual flaming procedures for sterility are employed.

Although the decision regarding the number of colonies to be placed into the saline tube in order to achieve the appropriate concentration range is ultimately a matter of practice with a wide variety of colony consistencies and sizes. Approximate guidelines relating the diameter of the colony to the number of such colonies can be developed to facilitate achieving the standard inoculum rapidly.

After loop transfer of colonies to the saline tube 13 (gently rubbing the loop on the inside of the tube just below the meniscus aids in releasing particularly sticky colonies from the loop), the tube 13 is flamed, screwcapped, vortexed for 15 seconds and placed in the inoculum port of the photometer lid. A white, vertical marker line on the upper part of the tube aids in alignment (i.e., white marker is aligned with a similar line located on the photometer lid). The standardize button 79 is depressed and the meter 68 needle equilibrium position noted. If the needle is within the standard inoculum range, the saline inoculum is ready for dilution and introduction into the cuvette. If the needle is in the "under" region, the tube 13 is removed from the photometer and additional colony(ies) added. If the needle is in the "over" region, sterile, filtered 0.90 gm % saline (provided) is added to the tube stepwise until the inoculum has been diluted to within standard range.

B. Presentation of Standardized Inoculum to the Antimicrobial Panel

1. Loading the cuvette with antimicrobial discs

After selection of the desired panel of antimicrobial agents, the disc dispenser 14 is loaded by inverting it and inserting the appropriate cartridges 39 (mouth up) into the holes 19 of the dispenser 14. Care must be taken that the discs 16 of each cartridge 39 are properly packed (i.e., lying 90° to the long axis of the cartridge) and that a gap no longer than 3 mm exists between the top disc and the mouth of the tube. After all cartridges are loaded, the dispenser 14 is rotated 180° back to its normal upright position. The Krayton closure 34 is removed from a cuvette 12. With the dispenser 14 standing on a bench top (or suitable table), the cuvette 12 is inserted on the dispenser track and pushed in until the stop 45 is reached. The lever arm 51 of the dispenser is then depressed and released causing one disc 16 to be dispensed into each disc port 26 of the cuvette 12. The cuvette 12 is removed from the dispenser and the Krayton closure 34 firmly replaced, thereby resealing the cuvette.

2. Filling the Cuvette with Broth Inoculum (FIGS. 9-13)

Following standardization, 2.0 milliliters of the saline stock inoculum are transferred from tube 13 with a sterile pipette into a 20 × 125 mm tube 78 (flat-bottom, flint glass, 18-415 screw capped) containing 18.0 ml. of sterile, 0.45 micron membrane-filtered, eugonic broth (previously described). The usual microbiological procedure of flaming the mouths of the tubes is used and after introduction of the inoculum, the inoculated eugonic tube is capped. This tube 78 is then inverted gently several times to mix the contents, uncapped and immediately screwed in an upright position, into cuvette inoculum tube port P until the tube seats firmly against the Krayton gasket 32. The first step and succeeding steps in the proper filling of a cuvette with broth inoculum are illustrated in FIG. 9. Cuvette 12 is now gently rotated 180° in such a manner as to completely drain the contents of the inoculum tube 78 into cuvette reservoir R (FIG. 10). Cuvette 12 is placed with reservoir end wall 112 on a level surface 114. In this position the long axis of cuvette is perpendicular to the level surface as shown in FIG. 11. Cuvette 12 is now rotated 90° so that the broth inoculum drains from the reservoir into the interconnected distribution lobes 15 as shown in FIG. 12. This rotation is most easily accomplished by simply grasping the non-reservoir end of the cuvette 12 and lowering it to the level surface so that the backside 9 of the cuvette (on which the cuvette bracket B is located) rests on the level surface 114 as shown in FIG. 13. Draining is complete in 8 seconds after which the final rotation is performed. This rotation simply consists in rotating the cuvette 90° to an upright position (i.e., the position in which it was loaded with antimicrobial discs), resting on end wall bottom edges 116 and feet 118 under Reservoir R. It is quite important that the cuvette remain level during this final rotation and this is ensured by performing the rotation in such a manner that both ends of the cuvette remain in contact with the level surface during the rotation. Examination of the properly filled cuvette should reveal equal levels of broth inoculum in all chambers. The disc 16 in each tubular holder 29 should be just below the surface of the broth. In certain cases, discs 16 will not be lying flat, however, this will not present any problem as long as the disc is in contact with the broth.

C. Incubation/Agitation of the Loaded Cuvette

Immediately after the broth inoculum distribution in the antimicrobial disc loaded cuvette, the cuvette is placed in the incubator-shaker 30. The workload in the average clinical microbiology laboratory is probably large enough to require that a number of cuvettes be introduced into the incubator-shaker at once. It is recommended that if, for example, ten bacterial isolates are to be examined per hour, the ten standard inocula be prepared first after which the cuvettes are loaded and placed on a single rack of the incubator-shaker 30. They are then simultaneously incubated and agitated for the standard three hour period at 36°C. During the incubation period, the incubator-shaker can be briefly stopped in order to insert a second or third rack of cuvettes. After three hours of incubation/agitation, the rack of cuvettes is removed and brought to the photometer for reading.

D. Reading of the Cuvette

1. After opening the right door 74 of the photometer, the cuvette is placed on the photometer carriage 46 via its bracket B.

2. The door 74 is closed and the "run" button 81 depressed. The carriage 46 moves the cuvette 12 through the photometer analyzer 62 dwelling briefly at each chamber S for reading.

3. The 35° light scattering from each chamber $S_{1-12}$ is read and compared to the first chamber $S_c$ which receives no antibiotic and serves as the growth control. The sequence of events is as follows:

a. The control chamber $S_c$ is read and Log C* is calculated $[A_r]t$ = light scattering of test chamber $S_r$ with antibiotic after incubation time $t$.
$C_t$ = light scattering of control chamber after incubation time $t$.
$C_o$ = light scattering of initial (time $t = o$) standard broth inoculum.

The initial inoculum concentration $C_o$ is an instrumental constant derived from the known initial inoculum in the first tube.

b. Log $C_t/C_o$, the growth index, is now calculated by digitally subtracting log $C_o$ from Log $C_t$. The result is printed on paper tape or preprinted card.

C. Log $[A_1]_t$, the light scatter from the first unknown chamber $S_1$, is now read and Log $C_t/[A_1]_t$ is calculated.

The result is divided by Log $C_t/C_o$ and printed on paper tape or preprinted card. The process is repeated for each chamber until all chambers have been read and the result printed out.

The net result of the computation is to rate on a 0–100 scale the inhibitory effectiveness of each antibiotic. For example 0–50 might be a resistant rating, 65–100 a susceptible rating and 50–65 an intermediate rating.

4. The cuvette 12 is returned to its initial position and the control panel light signals the test to be over.

If sufficient growth (i.e., growth index less than 0.9) has occurred during the three hour incubation period, the cuvette 12 may be re-incubated an additional period of time before accepting the final readings.

We claim:

1. A compartmented container for dividing and testing the reaction of a number of reactants upon a solution comprising a longitudinal array of compartments having a longitudinal axis, each of said compartments having a filling and a testing lobe, partitions between each of said compartments said filling and testing lobes in each of said compartments being substantially aligned with each other, a testing lobe rest disposed parellel to said longitudinal axis and for holding said array with said testing lobes disposed in a testing lower position below said filling lobes to cause said solution to flow into said testing lobes from said filling lobes and be there held, a filling lobe rest disposed parallel to said longitudinal axis and for holding said filling lobes in a filling lower position below said testing lobes to cause said solution to be distributed within said filling lobes, a reservoir contiguous to said filling lobes for providing said solution to said filling lobes, connecting ports in said partitions between said reservoir and each of said filling lobes to allow quantities of said solution to become equally distributed between said filling lobes from said reservoir when said filling lobes are disposed in said filling lower position, said filling lobes in said filling lower position each having a volume which contains quantities of said solution which are smaller than the volume of each of said testing lobes in said lower position, said filling testing lobes being connected to one each of said testing lobes whereby rolling said container about its axis with said filling lobes in the filling lower position to the position in which said testing lobes are in the testing lower position pours said equally distributed quantities of solution into said testing lobes, and apertures in a wall of each of said compartments above said testing lobes for inserting said reactants into said testing lobes.

2. A compartmented container as set forth in claim 1 wherein said reservoir has a connection for a supply tube of a predetermined quantity of said solution, and said supply tube and said reservoir each having capacity for an amount of a solution which can be divided and accommodated separately within each of said lobes.

3. A container as set forth in claim 2 wherein each of said compartments is substantially holster-shaped having butt and nose sections, said filling lobes comprising said butt sections and said testing lobes comprising said nose sections.

4. A container as set forth in claim 1 wherein said apertures comprise apertured tubular fingers disposed within each of said compartments, the tips of said tubular fingers being disposed a short distance within each of said testing lobes, and ports in said tips whereby the contents of said tubular fingers are eluted into the quantities of solution in each of said testing lobes.

5. A container as set forth in claim 4 wherein said tubular fingers each comprise a substantially closed tube having slot means disposed adjacent said tip whereby said reactants are uniformly held for elution within said quantities of solutions in said testing lobes.

6. A container as set forth in claim 5 wherein removable plugs are disposed within each of said apertures leading into said tubular fingers.

7. A container as set forth in claim 6 wherein said plugs comprise a flexible strip having a longitudinal array of individual plugs connected into said strip to facilitate insertion and removal.

8. A container as set forth in claim 1 wherein each of said testing lobes is transparent to facilitate photometric analysis of their contents.

9. A container as set forth in claim 8 wherein said entire compartmented container is transparent.

10. A container as set forth in claim 1 wherein said reservoir is contiguous to one of said compartments and connected thereto by a filling port, partitions between each of said compartments, an array of connecting ports disposed in said partitions in the bottom of each of said filling lobes when said filling lobes are in said filling lower position whereby said solution flows into and distributes equally into each of said filling lobes.

11. A container as set forth in claim 10 wherein an array of vent ports are disposed in the tops of each of said partitions in the top of said filling lobes when said filling lobes are in said lower position to facilitate equal distribution of solution within said filling lobes.

12. A container as set forth in claim 11 wherein said compartmented container includes a top wall on a surface remote from said lobes, said apertures being disposed in said top wall, and said apertures having a tubular finger with an open end connected to said top wall and a tip inserted within each of said compartments to just within the position of said quantity of solution in each of said testing lobes.

13. A container as set forth in claim 12 wherein said tips of each said tubular fingers are substantially closed and a slot is disposed in each of said tips.

14. A container as set forth in claim 1 wherein a connection for a supply tube is disposed substantially parallel to said of longitudinal axis of said compartments whereby said container and supply tube are maintained substantially parallel to each other to conserve space and facilitate pouring of the contents of said supply tube into said reservoir.

15. A container as set forth in claim 1 wherein said compartmented container comprises a top section and a base section, said top section including an apertured top wall for said compartments and said reservoir, and said top wall being sealed to said base to cover said compartments and said reservoir.

16. A container as set forth in claim 15 wherein said reservoir includes a connection for a supply tube, and said connection is equally divided between said top and base sections whereby the fabrication of said connection is facilitated.

17. A container as set forth in claim 15 wherein said apertured top wall comprises an array of apertured tubular fingers connected to the said top section for insertion within said chambers when said top and base sections are engaged with each other.

18. A container as set forth in claim 1 wherein a connecting bracket is attached to said container to facilitate mounting it for processing.

19. A container as set forth in claim 18 wherein said bracket comprises a bar connected to one side of said longitudinal array of compartments and spaced therefrom at its lower edge to provide a mounting slot.

* * * * *